Aug. 18, 1970 C. C. LEWIN 3,524,948

METHOD FOR INDICATING THE DIALING
OF TOLL TELEPHONE CALLS

Filed June 29, 1967

INVENTOR.
CHARLES C. LEWIN

BY Christie, Parker & Hale
ATTORNEYS.

United States Patent Office
3,524,948
Patented Aug. 18, 1970

3,524,948
METHOD FOR INDICATING THE DIALING OF TOLL TELEPHONE CALLS

Charles C. Lewin, Studio City, Calif., assignor to Albert E. Lewin, Studio City, Calif.

Filed June 29, 1967, Ser. No. 650,009
Int. Cl. H04m *1/00*
U.S. Cl. 179—81 11 Claims

ABSTRACT OF THE DISCLOSURE

A method for visually determining the placement of a toll telephone call while dialing the called number. The method contemplates the connection of a high resistance signalling indicator across a pair of wires connecting a subscriber's telephone to a telephone company central office with a suitable voltage dropping resistance inserted into the circuit. When dialing a local call the indicator provides a signal (e.g. flashing light) during each return of the telephone hand set dial. When dialing a toll call the signals from the device cease after a predetermined number of operations of the dial giving the user an immediate indication that a long distance "toll" call is being placed.

BACKGROUND OF THE INVENTION

Figure 2:
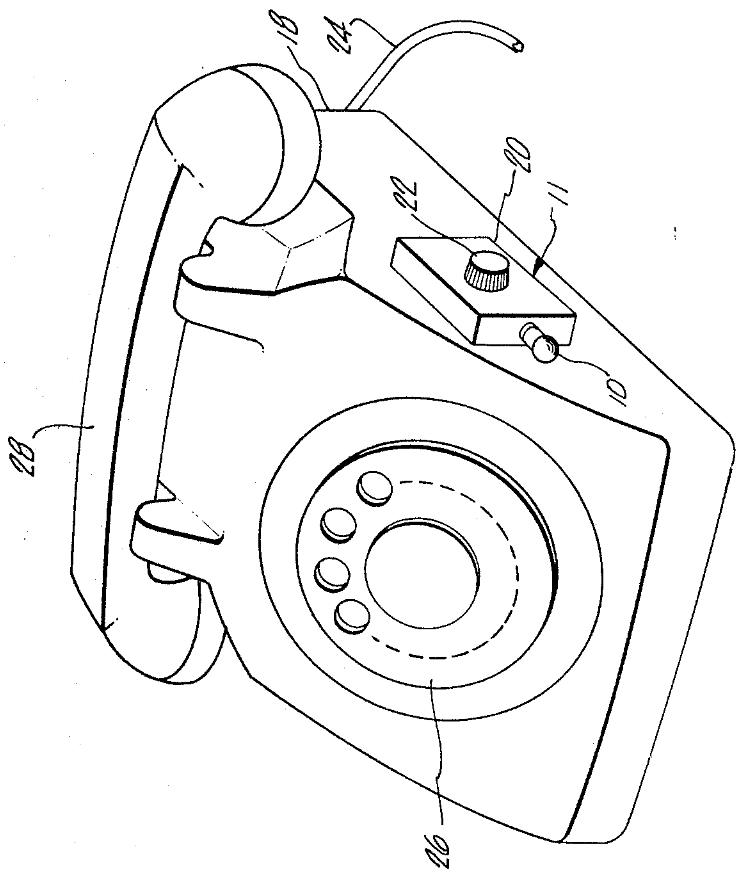

This inevntion relates to signalling devices and in particular to a method and simple, inexpensive device suitable for connection to a telephone to give an indication when toll telephone calls are being dialled.

In large metropolitan areas it is common for telephone company service to be provided to subscribers in such a manner that calls placed within a certain geographical area are considered one type of call while calls placed outside that area are considered to be a second type of call. Typically the two types of calls referred to above are described as "local" and "toll" calls. The local calls are calls for which there is a fixed charge upon placement of the telephone call and the calling party may then talk for an unlimited amount of time without incurring further expense. In contrast, toll calls are calls which are measured as to duration and a charge determined according to the length of time the connection is made between a calling and a called party.

It is normal telephone company practice to assign seven digit telephone numbers to each subscriber who wishes to be provided with telephone service. In the past this seven digit telephone number has been commonly provided in the form of a prefix consisting of the first two letters of an exchange designation and five numbers. More recently, the use of letters preceding the five digit number has been dispensed with in favor of providing all number telephone assignments.

In the former situation, but more particularly in the latter, it has been somewhat difficult for the user of a telephone to distinguish between those occasions when he is placing a local call from those occasions when he is placing a toll call. Under the system utilizing letter prefixes and numbers, this confusion may arise from a similarity of exchanges wherein one is a local call and the other a toll call. Under the all number calling system the problem is even more aggravated because it is more difficult to develop an awareness of which numbers correspond to exchanges which represent toll telephone calls.

SUMMARY OF THE INVENTION

The present invention provides a simple apparatus and a method for solving the above problem. In terms of apparatus, the invention contemplates a resistance signalling device adapted for connection to a telephone hand set in parallel circuit relationship with a pair of wires connecting the telephone hand set to the telephone company central office. An impedance may be provided in the connection between the device and the pair of wires to the telephone company office to adjust the voltage level to the signalling device.

In terms of method, the invention contemplates the steps of determining the placement of a toll telephone call while dialing the called number by connecting a signalling device in parallel circuit relationship across a pair of wires connecting a telephone hand set to the telephone company central office. A predetermined amount of impedance may be inserted in the connection between the device and the pair of wires to the central office and the telephone hand set dial is then operated to cause dialing information to be transmitted to the telephone central office. Indications from the signalling device are observed as the dial of the telephone hand set is operated and the cessation of indications from the device subseqeunt to the occurrence of a predetermined number of operations of the dial is an indication of the placement of a toll telephone call.

Figure 1:
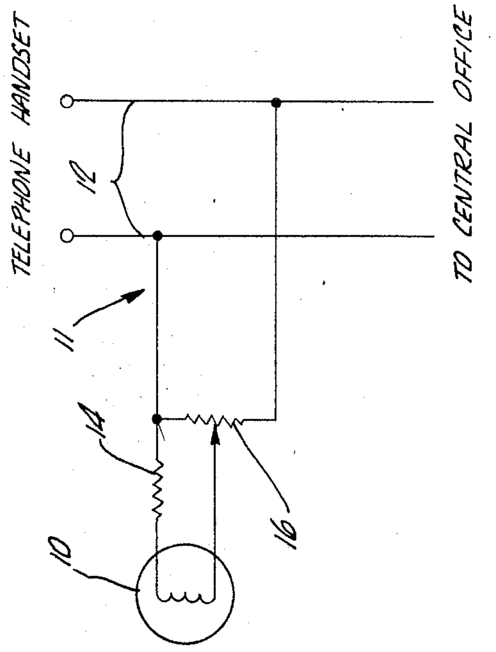

The preceding will be better understood by reference to the following figures in which:

FIG. 1 is a schematic diagram illustrating the connection of the device of this invention to a pair of wires to a telephone company central office; and FIG. 2 is a perspective view of a telephone hand set with a preferred embodiment of the device of this invention attached thereto.

DESCRIPTION OF PREFERRED EMBODIMENTS

Referring now to FIG. 1, a schematic diagram illustrating the connection of the device of the present invention, there is shown therein a signalling device 10 connected in parallel across a pair of wires 12 which extend from a telephone hand set to a telephone company central office. Signalling device 10 is preferably a high resistance gas-filled lamp or light bulb having a predetermined breakdown voltage. The signalling device is connected to the pair of wires 12 by means of a suitable impedance 14. The value of the impedance is selected based on the physical distance of the telephone hand set with which the impedance is to be used from the telephone company central office. The function of the impedance 14 is to introduce a sufficient amount of impedance into the circuit such that the voltage levels are set for consistent operation of the signalling device 10.

In a preferred embodiment, a second variable impedance 16 is introduced into the circuit to provide a means whereby the telephone subscriber can adjust the impedance of his signalling device such that satisfactory indications from the signalling device are provided.

In addition to a gas-filled lamp, it is contemplated that other devices capable of generating audio or visual signals can be provided as a substitute for the gas-filled lamp described above. In one embodiment it is contemplated that a door bell type buzzer may be provided as a satisfactory substitute for the lamp.

FIG. 2 is a perspective view of a telephone hand set 18 showing the indicator of this invention mounted thereon. As shown therein, the indicator is provided with a housing 20 having a knob 22 provided on the front surface thereof. The device illustrated in FIG. 2 depicts the preferred embodiment of the present invention, being provided with a potentiometer such as potentiometer 16 shown in FIG. 1. Knob 22 is a mechanical means for operating the slider on such a potentiometer. Other means for operating the potentiometer are also possible as, for example, a countersunk screw located in the face of housing 20, which screw is operated by means of a screwdriver. Extending from one side of indicator 11 is a signalling device such as device 10 of FIG. 1 for providing the indications to the telephone subscriber as the telephone dial is operated.

In terms of the method of the invention, the device 11 is mounted on a hand set or on a remote switch box by suitable means and electrical connections are established between the device and the cord 24 connecting the hand set to the telephone company central office. Where the hand set housing is provided with suitable openings for push buttons, switches, or the like, the device may be enclosed entirely within the hand set housing with the device being disposed therein so that visible or audible signals from the device are transmitted to the exterior of the housing as, for example, through one of the openings. Potentiometer knob 22 is operated in conjunction with operations of the dial such that the indicator 10 gives a positive indication during the first or second operations of telephone hand set dial 26 following the lifting of the receiver 28 from the switch hooks on the telephone hand set. When the proper amount of impedance is introduced into the circuit, the device is ready for operation and upon the placement of the call the user operates dial 26 and observes indications from signalling device 10. In a typical seven number digit calling area, the placement of a local call will result in an indication from the signalling device 10 each time the telephone dial returns to its starting position. In areas where a toll call as well as a local call may be placed from a subscriber's hand set, the placement of a toll telephone call will result in the cessation of indications from the device after the operation of the dial a predetermined number of times. Typically, the cessation of indications from the signalling device occurs after the third or fourth operation of the dial. If a user of the telephone is placing a toll call he immediately knows that the call will be more expensive and costly to him because of the cessation of indication from the signalling device prior to the completion of the dialing of his telephone call and, therefore, he may elect to terminate the call before completion to seek a toll free number or failing this may limit his toll call to the minimum time allowed in a toll period.

What is claimed is:

1. A method of verifying the placing of a toll telephone call from a telephone hand set comprising:

(a) connecting a signalling device across a pair of wires connecting the hand set to a telephone company central office;

(b) operating the call placing mechanism on the telephone hand set; and (c) observing the presence of indications from the device subsequent to the occurrence of a predetermined number of operations of the mechanism.

2. A method according to claim 1 including the step of inserting an impedance into the connection between the device and the pair of wires to adjust the voltage level to the device.

3. A method according to claim 1 wherein the signalling device is an audio device capable of creating audible indications in response to operation of the dial and the observation of the presence of indications comprises listening for indications from the device as the dial is operated.

4. A method according to claim 1 wherein the signalling device is a gas-filled resistance lamp and the indications of the device are observed visually as the telephone dial returns to its starting position.

5. Apparatus for indicating the dialing of a toll telephone call comprising:

(a) a telephone hand set having a means provided thereon for generating calling information signals to a telephone company central office; and (b) an impedance signalling device connected across a pair of wires connecting the telephone hand set to the telephone company central office, whereby operation of the generating means produces at least one indication by the signalling device.

6. Apparatus according to claim 5 including an impedance connected between the signalling device and the pair of wires to the telephone company central office for introducing a voltage level adjusting amount of impedance in the circuit between the signalling device and the central office.

7. Apparatus according to claim 5 wherein the signalling device produces an audio signal.

8. Apparatus according to claim 5 wherein the signalling device produces a visible signal.

9. Apparatus according to claim 5 wherein a potentiometer is provided in the connection between the signalling device and a pair of wires to the telephone company central office for adjusting the impedance to provide a positive indication from the signalling device.

10. Apparatus according to claim 5 wherein the signalling device is an audible buzzer.

11. Apparatus according to claim 5 wherein the signalling device is a neon lamp having a predetermined breakdown voltage.

No references cited.

KATHLEEN H. CLAFFY, Primary Examiner

W. A. HELVESTINE, Assistant Examiner